United States Patent [19]
Van Raden

[11] 3,858,907
[45] Jan. 7, 1975

[54] BALL AND SOCKET MECHANICAL AND ELECTRICAL TRAILER HITCH

[76] Inventor: Leslie T. Van Raden, 622 9th, Allison, Iowa 50602

[22] Filed: June 21, 1973

[21] Appl. No.: 371,974

[52] U.S. Cl. ............................................. 280/422
[51] Int. Cl. ........................... B60d 1/06, B60d 1/08
[58] Field of Search ............. 280/421, 422; 191/11; 339/7

[56] References Cited
UNITED STATES PATENTS

| | | | |
|---|---|---|---|
| 2,673,965 | 3/1954 | Cass | 280/422 |
| 3,116,940 | 1/1964 | Jines | 280/422 |
| 3,328,741 | 6/1967 | Brown | 280/422 |

Primary Examiner—Trygve M. Blix
Assistant Examiner—Stuart M. Goldstein
Attorney, Agent, or Firm—Henderson & Strom

[57] ABSTRACT

This invention relates to a hitch assembly for mechanically and electrically connecting a towed vehicle to a prime mover, wherein the ball of the hitch assembly includes at least one spherical segment connected to the prime mover's electric supply, the socket of the hitch has a window formed therein for exposing the segment when mechanically coupled, and a housing is secured to the socket over the window, the housing encasing a conductive element connected to an electric service item on the towed vehicle, which element is resiliently and conductively engageable with the segment during mechanical coupling.

2 Claims, 5 Drawing Figures

PATENTED JAN 7 1975  3,858,907
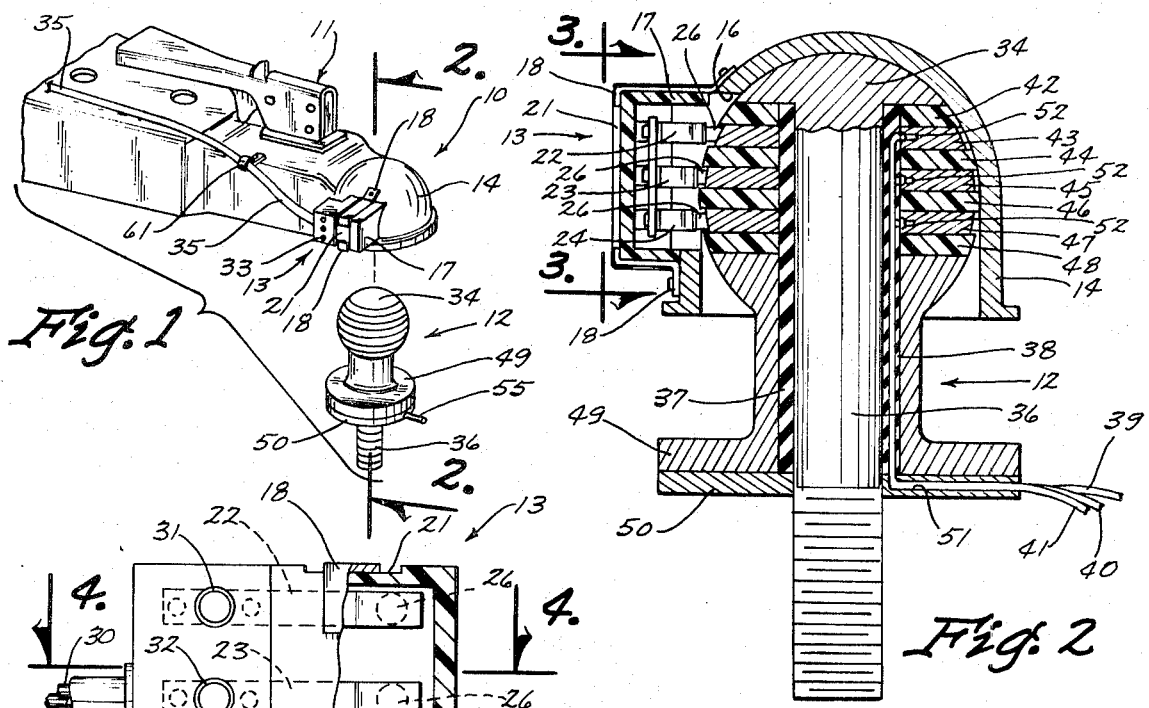
Fig. 1
Fig. 2
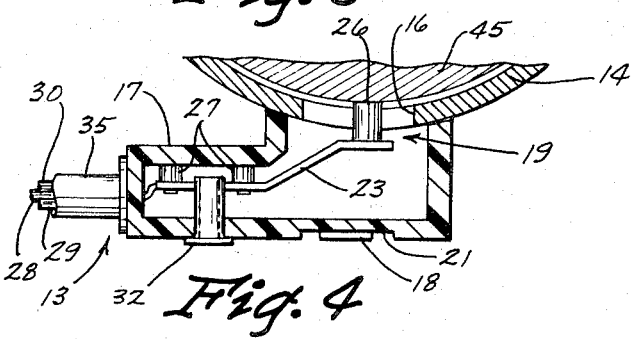
Fig. 3
Fig. 4
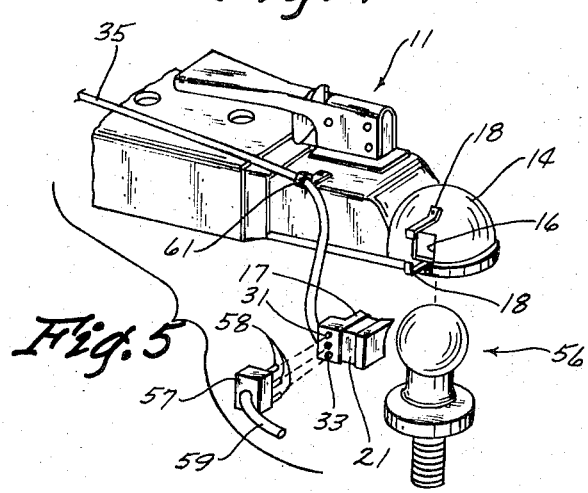
Fig. 5

3,858,907

BALL AND SOCKET MECHANICAL AND ELECTRICAL TRAILER HITCH

BACKGROUND OF THE INVENTION

The field of this art includes all types of devices for both mechanically and electrically connecting an object on a vehicle to be towed, and therefore necessarily subject to rotational movement to a certain degree, to an object on a towing vehicle.

A search in this field discloses the following U.S. patents believed pertinent: U.S. Pat. Nos. 1,761,816; 1,805,642; 1,922,395; 1,926,264; 1,931,752; 1,937,214; 1,970,014; 1,980,015; 2,001,393; 2,094,399; 2,118,884; 2,119,460; 2,480,413; 2,564,520; 2,673,366; 3,181,887; 3,328,741; 3,428,334; 3,628,811; 3,671,757; 2,673,965; 2,924,464; 3,116,940; 3,711,122.

The main argument against the type of structures shown in the aforementioned patents was that they were too complicated and costly of manufacture. Furthermore, several structures could be installed incorrectly, and shorting was a definite possibility.

SUMMARY OF THE INVENTION

The invention comprises adapting a ball and socket hitch assembly for mechanically towing purposes to be utilized as an electrical connection simultaneously between the prime mover and the towed vehicle, and wherein the ball is comprised of one or more spherical segments connected in the electrical system of the prime mover, and with the hitch having a window formed in its socket for exposing the segment(s), and with a housing disengageably mounted on the socket and encompassing one or more resilient-type contacts connected to electrical components on the trailed vehicle, each contact operable to engage and transmit current from a segment.

The present invention has as an object the provision of an improved electrical coupling for a trailer hitch.

Another object of this invention is a trailer hitch for acommodating both electrical and mechanical coupling which leaves little chance of erroneous installation.

Still another object of this invention is the provision of a trailer hitch for both mechanical and electric coupling which is very simple and economical to manufacture.

Yet another object of this invention is the provision of a trailer hitch having a socket adapted for both mechanical and electrical coupling to the ball of the prime mover for the transmission of both mechanical and electrical energy, and further wherein the use of a conventional male plug connection from the prime mover is not obviated in that the socket is also adapted to be electrically connected to the male plug for bypassing a ball not connected in the electric circuit of the prime mover.

These objects, and other features and advantages of this invention will become readily apparent when reference is made to the following description, when taken in conjunction with the accompanying drawings.

BRIEF DESCRIPTION OF THE DRAWINGS

FIG. 1 is an exploded perspective view of the trailer hitch coupling of this invention;

FIG. 2 is an enlarged vertical sectional view of the coupling shown in assembled relation for both mechanical and electrical connection;

FIG. 3 is a further enlarged side elevational view particularly of the housing of this invention, as seen from the lines 3—3 in FIG. 2;

FIG. 4 is a fragmentary, horizontal sectional view as taken along the line 4—4 in FIG. 3; and FIG. 5 is an exploded perspective view of a modified embodiment of the invention.

DESCRIPTION OF THE PREFERRED EMBODIMENT

Referring now to the drawings and particularly FIGS. 1 – 4 inclusive, the trailer hitch of this invention is indicated generally at 10 in FIG. 1, and basically comprises a socket unit 11 adapted for connection to a towed vehicle (not shown), a ball unit 12 adapted for connection to a prime mover (not shown) for towing the vehicle, and an electrical connection unit 13 a portion of which is part of the socket unit 11 and a portion of which is part of the ball unit 12 as described in detail hereinafter.

The socket unit 11 is conventional, except that the circular socket 14 (FIGS. 1 and 2) has an opening or window 16 (FIG. 5) formed in a side of the socket 14. The import of this will be seen hereinafter.

The electrical connection unit 13 includes a housing 17 (FIGS. 1 and 4) which has a groove 21 formed about three sides thereof, one side 19 (FIG. 4) being open to encompass the window 16, the groove 21 enabling the housing 17 to be fastened to the window side of the socket 14 by means of clips 18.

Interior of the housing 17 are a plurality of leaf spring conductors 22, 23 and 24 (FIGS. 3 and 4), each conductor having a contact disc 26 formed on the outer end thereof, with the inner ends of the conductors being mounted by insulating blocks 27 to one wall of the housing. A trio of wires 28, 29 and 30 are connected to the three conductors 22, 23 and 24, with the wires being encompassed in a flexible conduit 35 for leading rearwardly along the socket unit 11 for electrical connection to various components of the trailer or vehicle being towed. Also in electrical contact with the three conductors 22, 23 and 24 are a trio of conductive receivers 31, 32 and 33 (FIGS. 3 and 4) which are mounted in a side of the housing 17 for a purpose hereinafter detailed.

The ball unit 12 is comprised of a bolt having a head 34 (FIG. 2) and integral therewith a shank 36 adapted for mounting in a vertical position. A non-conductive tube 37 embraces the shank 36 partially of its length, and has a slit 38 (FIG. 2) formed therein through which a trio of electric lead wires 39, 40 and 41 are disposed, the wires 39 – 41 inclusive being connected in the electric circuitry of the vehicle, and being protected by a conduit 55 (FIG. 1).

The electrical connection unit portion of the ball unit 11 includes a washer-like insulating ring 42, a conductor ring 43, an insulating ring 44, a conductor ring 45, an insulating ring 46, a conductor ring 47, and an insulating ring 48 (FIG. 2) all of the rings being disposed about the non-conductive tube 37 and forming by varying diameters as best illustrated in FIG. 2, the outline of a ball. A base 49 is formed about the tube 37 and the shank 36 for holding the rings 42 – 48 inclusive, together in fixed position and against rotation, a washer 50 also being disposed at the bottom of the base 49, the washer 50 having a hole 51 drilled therein through which the wires 39 – 41 inclusive extend prior to being encased in the conduit 55 (FIG. 1). The free ends of the three leads 39, 40, and 41 are connected electrically by fasteners 52 to the three conductor rings 43, 45 and 47.

In use, referring to FIG. 2 it is seen that the metalic ball unit 12 is adapted for mechanical connection to the socket 14 of the socket unit 11 such that movement of the prime mover (not shown) to which the ball unit 12 is connected would result in like movement, via the socket unit 11, of a towed vehicle (not shown) to which the socket unit 11 is connected. Furthermore, due to electrical current being transmitted to the three conductor rings 43, 45 and 47 of the ball unit 12, and due to the three lead spring conductors 22, 23 and 24 (FIG. 2) being flexibly and resiliently engaged with the three conductor rings, it is seen that electrical energy in addition to mechanical energy is transmitted from the ball unit 12 to the socket unit 11. Current is thereby transferred to various components (not shown) such as brake lights, turn signals, and other accessory electrical items which are a conventional part of the towed vehicle.

A modified embodiment of the invention is shown in FIG. 5, wherein a conventional ball unit 56 is disclosed, but with the socket unit 11 and the housing 17 including all of the electrical components which are illustrated in the embodiment of FIGS. 1 – 4 inclusive. It is to be noted, nevertheless, that the ball unit 56 does not have any of the electrical components of the prior embodiment. A conventional male plug 57 having a trio of projections 58 are illustrated, which projections are electrically connected to lead wires (not shown) encased in a flexible conduit 59 and which lead to the electric system of a towed vehicle.

In order to electrically bypass the ball unit 56, the receivers 31, 32 and 33 of the housing 17 are now brought into use, in that they receive the projections 58 from the plug 57 such that electrical energy is transmitted to the trailed vehicle via the housing 17 and its leaf spring conductors 22–24 inclusive. It will be noted that in the embodiment of FIG. 5, such that there is no shorting of any circuits, the housing 17 is removed from the clips 18 which fasten it to the socket 14, a fastening device 61 (FIG. 5) holding the conduit 35 to a portion of the socket unit 11 for safety purposes. Should the socket unit 11 of the FIG. 5 embodiment be subsequently used with a ball unit 12, the housing 17 is merely remounted on the socket 14 such that the contact discs 26 (FIG. 4) of the three leaf spring conductors are again disposed at the open side 19 of the housing 17 such that when engaged with a ball unit 12, the discs 26 engage conductor rings of the ball unit 12 for transmitting electrical energy.

I claim:

1. A hitch assembly for mechanically and electrically connecting a towed vehicle to a prime mover comprising in combination:

a metallic ball unit adapted for mechanical connection to the prime mover and having a ball including at least one spherical segment affixed thereto and insulated electrically therefrom, said unit including a passageway for receiving a first electric conductor from the prime mover and attached to said segment;

a socket unit adapted for mechanical connection to the towed vehicle and having a socket adapted to partially enclose said ball for transmitting mechanical thrust therebetween, said socket having an opening formed therein whereby said segment is exposed;

electrical connection means including at least one second electrical conductor leading to the towed vehicle, said connection means including a housing removably secured to said socket over said opening and having an element connected to said second conductor and resiliently engageable with said segment when said housing is secured, whereby to transmit electric current from said segment to said element during mechanical use of the hitch assembly, and wherein said ball unit includes a plurality of conductive spherical segments affixed to the ball and each segment separated by a non-conducting segment on either side thereof, and said connection means including a plurality of flexible elements, such that each element is engageable with a conductive segment for transmitting current therebetween.

2. A hitch assembly as defined in claim 1 and wherein all of said segments are of a washer-like nature, and are horizontally disposed in vertically spaced relation, and are mounted about a non-conductive tube which in turn embraces the vertical shank of the ball unit.

* * * * *